(12) United States Patent
Schomp et al.

(10) Patent No.: US 11,936,615 B2
(45) Date of Patent: *Mar. 19, 2024

(54) MAPPING INTERNET ROUTING WITH ANYCAST AND UTILIZING SUCH MAPS FOR DEPLOYING AND OPERATING ANYCAST POINTS OF PRESENCE (PoPs)

(71) Applicant: Akamai Technologies, Inc., Cambridge, MA (US)

(72) Inventors: Kyle G. Schomp, Cleveland, OH (US); Rami Al-Dalky, Redmond, WA (US)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,574

(22) Filed: Mar. 21, 2022

(65) Prior Publication Data

US 2022/0353236 A1     Nov. 3, 2022

Related U.S. Application Data

(63) Continuation of application No. 16/907,854, filed on Jun. 22, 2020, now Pat. No. 11,283,757.

(Continued)

(51) Int. Cl.
*G06F 15/173* (2006.01)
*H04L 45/74* (2022.01)
(Continued)

(52) U.S. Cl.
CPC .......... *H04L 61/4511* (2022.05); *H04L 45/74* (2013.01); *H04L 61/5007* (2022.05); *H04L 67/1008* (2013.01)

(58) Field of Classification Search
None
See application file for complete search history.

(56) References Cited

U.S. PATENT DOCUMENTS 10,645,008 B1 * 5/2020 Sawyer ............... H04L 45/028
11,283,757 B2    3/2022 Schomp et al.
(Continued)

OTHER PUBLICATIONS

U.S. Appl. No. 16/907,854, filed Jun. 22, 2020.
Transmittal Letter titled Communication Under MPEP § 609.02, submitted with this SB/08 of Mar. 21, 2022, 2 pages.

*Primary Examiner* — Wing F Chan
*Assistant Examiner* — Andrew Woo

(57) ABSTRACT

Generally, aspects of the invention involve creating a data structure (a map) that reflects routing of Internet traffic to Anycast prefixes. Assume, for example, that each Anycast prefix is associated with two or more deployments (Points of Presence or PoPs) that can provide a service such as DNS, content delivery (e.g., via proxy servers, as in a CDN), distributed network storage, compute, or otherwise. The map is built in such a way as to identify portions of the Internet (e.g., in IP address space) that are consistently routed with one another, i.e., always to the same PoP as one another, regardless of how the Anycast prefixes are deployed. Aspects of the invention also involve the use of this map, once created. The map can be applied in a variety of ways to assist and/or improve the operation of Anycast deployments and thus represents an improvement to computer networking technology.

18 Claims, 7 Drawing Sheets

Related U.S. Application Data

(60) Provisional application No. 62/928,872, filed on Oct. 31, 2019, provisional application No. 62/866,159, filed on Jun. 25, 2019.

(51) Int. Cl.
*H04L 61/4511* (2022.01)
*H04L 61/5007* (2022.01)
*H04L 67/1008* (2022.01)

(56) References Cited

U.S. PATENT DOCUMENTS

2019/0132281 A1* 5/2019 Sawyer ................ H04L 47/122
2020/0412686 A1 12/2020 Schomp et al.

* cited by examiner

Algorithm 1: MAXBLOCK finds the maximum block covering IPs with similar routing

Input: $S \leftarrow$ list of all IPs
Input: $h[s,p] \leftarrow$ # of hits from IP $s$ to PoP $p$
Input: $T \leftarrow$ a threshold value 1  covered$[s] \leftarrow$ false $\forall s \in S$
2  for $root \in S$ ordered by $\sum_p h[r,p]$ desc do
3      if covered$[root]$ then
4          continue
5      $P_r \leftarrow \{p$ if $h[root,p] \neq 0\}$
6      for $r_{cover} \leftarrow 31$ to $1$ bit prefix of root do
7          $S_r \leftarrow \{s$ if $s$ covered by $r_{cover}$ $\forall s \in S\}$
8          if covered$[s]$ $\exists s \in S_r$ then
9              break
10         hits $\leftarrow \sum_{s,p} h[s,p]$ $\forall s \in S_r$
11         $P_{S_r} \leftarrow \{p$ if $h[s,p] \neq 0$ $\forall s \in S_r\}$
12         if $hits \geq T \wedge h[s,p] = 0$ $\forall p \in P_r, \exists s \in S_r$ then
13             break
14         $P_r \leftarrow \{p$ if $h[s,p] \neq 0$ $\exists s \in S_r\}$
15         covered$[s] \leftarrow$ true $\forall s \in S_r$
16     yield $r_{cover} + 1$ bit

FIG. 6

Algorithm 1: STEP 1. Find the least-specific prefixes covering IP addresses all routed to the same sink(s)

Input: $S \leftarrow$ list of all IPs
   Input: $h[s, p] \leftarrow$ # of hits from IP $s$ to PoP $p$
   Input: $T \leftarrow$ a threshold value
1   covered[$s$] $\leftarrow$ false for $s$ in $S$
2  for *root in S ordered by hits desc* do
3     if *covered[root]* then
4        continue
5     max-prefix $\leftarrow$ root
6     $P_r \leftarrow$ set $p$ where $h[\text{root}, p] > 0$
7     for $r_{cover} \leftarrow$ 31 *to* 1 *bit prefix of root* do
8        $S_r \leftarrow$ set $s$ in $S$ covered by $r_{cover}$
9        if *covered[s] for any s in $S_r$* then
10          break
11        $t \leftarrow \sum h[s, p]$ for $s$ in $S_r$
12        if $t \geq T$ & $h[s, p] > 0$ *for p not in $P_r$ & s in $S_r$* then
13          break
14        covered[$s$] $\leftarrow$ true for $s$ in $S_r$
15        max-prefix $\leftarrow r_{cover}$
16     yield max-prefix

FIG. 7

MAPPING INTERNET ROUTING WITH ANYCAST AND UTILIZING SUCH MAPS FOR DEPLOYING AND OPERATING ANYCAST POINTS OF PRESENCE (PoPs)

This application is based on, and claims the benefit of priority of, U.S. Application No. 62/866,159, filed Jun. 25, 2019, and of U.S. Application No. 62/928,872, filed Oct. 31, 2019, the contents of both of which are hereby incorporated in their entireties and for all purposes.

BACKGROUND

Technical Field

This application relates generally to routing of traffic on the Internet, particularly with Anycast, and to the development of maps reflecting such routing, and to the use of such maps for estimating and planning for load, placing and scaling points of presence (PoPs), and other applications.

Brief Description of the Related Art

Anycast is a popular technique for distributing traffic among multiple physical locations, also known as points of presence, or PoPs, on the Internet. Anycast is frequently used to provide authoritative and recursive DNS services, as well as by content delivery networks (CDNs). By advertising, via BGP, the same IP prefix from each PoP, traffic from sources on the Internet is routed to one of the PoPs according to properties of the path between the source and the PoPs. Routers along the path resolve conflicts between multiple paths to the same prefix according to a combination of best practices and policies enacted by individual autonomous systems (ASs).

Knowing how traffic will be distributed among the PoPs that are advertising an anycast prefix a priori is a challenging problem due to incomplete knowledge of the network graph and the varying policies implemented by ASs, which can be quite complex. Thus, it is difficult to determine precisely where any given IP address will be routed on an anycast prefix. As a direct result, there is a great deal of operational complexity in running production anycast services.

Recently, De Vries et al. [17] proposed Verfploeter as a powerful method to learn how traffic will be split among PoPs of an anycast service before it receives production traffic. By active scanning with ICMP Echo Requests from the anycast prefix to IP addresses on the Internet, Verfploeter identifies which PoP will receive traffic from an IP address by where the Echo Reply is received. Techniques for scanning the entire IPv4 Internet exist [18], however they are likely to produce incomplete results because many hosts do not respond to ICMP [22]. Further, scanning all of IPv4-space is onerous and does not scale well to many parties conducting their own scans, and, looking forward, full scans IPv6-space are impractical. The authors of [17] propose scanning one IP address per /24 block on the Internet chosen to be representative of the entire /24 block, leveraging work in [19]. This method, however, will (i) result in excess scanning when IP addresses in blocks less specific than 24-bits are all routed to the same PoP and (ii) inaccurate representation when IP addresses within the same /24 block are routed to different PoPs.

We place our work in the context of prior related work. As mentioned, de Vries et al. [17] propose a technique for measuring anycast catchments of responding IP addresses on the Internet. Our work is complementary to their work, as we show that if the sampling is done strategically using passive measurement from deployed anycast services then both the number of samples and the error in estimated catchments may be reduced. Sermpezis and Kotronis [32] propose a method that can infer catchments with uncertainty. The uncertainty in the inferred catchments depends upon the amount of data available on the network graph and the policies implemented by ASs. In contrast, our method has no reliance on knowledge of the network graph or specific policies, instead relying upon passive measurement from deployed anycast services. Both methods aim for the same goal and which method will produce a more accurate depiction of catchments likely depends upon the data available for analysis. de Oliveira Schmidt et al. [16] show that surprisingly few intelligently placed PoPs are needed to provide good global latency for an anycast service. Our work can help in analyzing production systems to identify whether their PoPs are appropriately located. Many works attempt to evaluate anycast deployments using probing traffic [9, 12, 13]. We take the opposite approach: we attempt to evaluate routing on the Internet using anycast deployments. In [19], the authors propose a method for identifying representative addresses per /24 block. Our approach defines the block for which a single address may be representative, which could be larger or smaller than a /24 block. While a /24 block is the smallest routable block on the Internet, traffic from a /24 block may still be partitioned among anycast catchments due to internal AS policies. Several other works [14, 21, 24, 28] construct maps of the Internet along various demarcations. We view this work as tangential to our own as different Internet maps serve different purposes.

With the above as background, this patent document presents a novel approach that greatly reduces the complexity of the problem. To the best of our knowledge, we present the first Internet map based upon anycast catchments. With the approach presented herein, it is possible to measure the routing of landmarks that are chosen to be representative for partitions of IP-space. This is due to the fact that many hosts on the Internet experience identical routing because they are within the same AS and /or have the same routing policies applied to them. Put another way, we describe a novel technique using passive measurements of existing anycast deployments that splits IP-space into consistently routed partitions, such that all IP addresses within a partition are routed to the same PoP for an arbitrary anycast deployment. Then, one IP address per partition may be selected and used in active measurements such as [17] to represent all IP addresses within the partition.

In sum, this patent document presents, among other things, (1) a theoretical approach using anycast catchments for creating a map of the Internet that partitions the Internet along differences in routing. Landmarks may then be selected to represent each partition, (2) a practical implementation of the approach that solves real-world problems with production anycast data, and (3) a validation and measurement of the error of the resulting map, showing its effectiveness over time and across anycast deployments.

BRIEF SUMMARY

This section describes some pertinent aspects of this invention. Those aspects are illustrative, not exhaustive, and they are not a definition of the invention. The claims of any issued patent define the scope of protection.

Basic familiarity with well-known web page, streaming, and networking technologies and terms, such as DNS, HTML, URL, XML, HTTP versions 1.1 and 2, HTTP over QUIC, MQTT, TCP/IP, and UDP, is assumed. All references to HTTP should be interpreted to include an embodiment using encryption (HTTP/S), such as when TLS-secured connections are established. The term "server" is used herein to include embodiments using either actual or virtualized hardware (a computer configured as a server, also referred to as an actual or virtualized "server machine") with server software running on such hardware (e.g., a web server). The terms "client" and "client device" are used herein to include embodiments having any combination of hardware with software. Put another way, while context may indicate the hardware or the software exclusively, should such distinction be appropriate, the teachings hereof can be implemented in any combination of hardware and software. The term web page or "page" is meant to refer to a browser or other user-agent presentation defined by an HTML or other markup language document.

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways. Any reference to advantages or benefits refer to potential advantages and benefits that may be obtained through practice of the teachings hereof. It is not necessary to obtain such advantages and benefits in order to practice the teachings hereof.

The following terminology is used herein: all IP addresses routed to the same PoP for a given anycast prefix are in the same "catchment." The set of PoPs and policies used to advertise a given anycast prefix are an Anycast "deployment." The PoP that a given IP address is routed to on an anycast prefix is the "sink."

Generally, aspects of the invention involve creating a data structure (a map) that reflects routing of traffic on the Internet to Anycast prefixes. Assume that each Anycast prefix is associated with two or more deployments (Points of Presence or PoPs) that can provide a service such as DNS, content delivery (e.g, via proxy servers, as in a CDN), distributed network storage, compute, or otherwise. The map is built in such a way as to identify portions of the Internet (e.g., in IP address space) that are consistently routed with one another, i.e., always to the same PoP as one another, regardless of how the Anycast prefixes are deployed. This means that the map can reveal that messages from a particular set of IP addresses (which messages are potentially from, e.g., clients of the service) will be routed together to the same PoP as one another (at least for the time period of validity of the map, and perhaps subject to temporal events like maintenance or outages that may introduce error). In a sense, the map reflects the aggregate result of Anycast routing policies (e.g., in the routers) of network providers between the set of IP addresses and the PoPs, during the valid time period.

It should be noted that the map does not necessarily indicate that a set of IP addresses are routed to a particular PoP, although that information may be included as known for a given point in time and Anycast deployment. Rather, the map indicates that in general a set of IP addresses will be routed to the same PoP as one another. The particular PoP depends on the Anycast deployment, that is, the number and location of PoPs advertising a given Anycast prefix at a given time.

Each set of IP addresses represents a partition of the IP space in a map. Since each partition is consistently routed, it can be represented by a single "landmark" IP address. Hence, measurements run against the landmark IP address can reveal routing changes or other information that is applicable to the entire partition, without the need to test against each IP address in the entire partition.

To create the map, the catchments for a given Anycast deployment (with, e.g., N points of presence advertising a prefix) are determined by software. This can be done, e.g., by inducing traffic to Anycast prefixes via probes or by examining logs of a real or test service provided via Anycast. A set of IP addresses that is being routed to a given PoP, for the given Anycast deployment, represents a catchment. This is repeated across multiple Anycast deployments. Then the method finds those sets of IP addresses that are consistently routed to the same PoP as one another, i.e., consistently across Anycast deployments. In some cases, this requirement can be relaxed, e.g., consistently routed to the same set of PoPs during a given time period.

To determine the sets of IP addresses that are consistently routed, an expansion step (also referred to as a "max-block") and a merge step can be performed, as set forth in the Detailed Description section of this document. Generally, in the expansion step, for each catchment of a given Anycast prefix, the algorithm starts with an IP address in the catchment and "expands" to find the maximum block of IP addresses (IP prefix) covering that selected IP address, where (i) all covered IP addresses in the prefix are routed to the same PoP or set thereof, (ii) none of the covered IP addresses are already covered by another covering prefix, and (iii) the covering prefix cannot be further expanded without violating (i) or (ii). Each IP address in each catchment is looped through in turn, with the result being the maximum size IP prefix (or prefixes) for each catchment of the given Anycast prefix. The above steps are repeated likewise for the other Anycast prefixes.

In the merge step, the algorithm looks at the generated maximum size IP prefixes across all Anycast prefixes. If two or more such IP prefixes are identical then they can be merged (remove duplicates). The algorithm also finds the covering IP prefixes that overlap with one another. If there are overlaps (e.g., there is a smaller IP prefix that is contained within a larger IP prefix), then the larger one of the overlapping IP prefixes can be split into sub-prefixes, one of which is the smaller one of the overlapping prefixes. (Put another way, from two overlapping prefixes, one larger and one smaller, there is created a first prefix equal to the smaller prefix; and, one or more other prefixes forming the remainder of the larger prefix.) This can be repeated until there are no longer any overlaps across all of the Anycast prefixes, discarding duplicates as noted above. This creates a set of resulting IP prefixes that are not overlapping but rather congruent across all of Anycast prefixes. Each of these are the IP prefixes (and accordingly a set of IP addresses) that are always routed to the same PoP as one another (hence, "consistently" routed). Note the IP addresses are not always routed to the same PoP across Anycast prefixes, but rather the same PoP as one another for a given Anycast prefix.

The consistently routed sets of IP addresses are the partitions in the map. Preferably, the largest possible sets are found. The consistently routed sets of IP addresses may not represent all of IP space. A miscellaneous partition can be defined for those not consistently routed or for which not enough data is available. From each partition a representative IP address ('landmark') can be selected, e.g., randomly or in any suitable manner. This landmark can thereafter be used for testing, e.g., measurements and represent the entire set of IP addresses that it is consistently routed with.

More details can be found in the Detailed Description section, below.

Aspects of the invention also involve the use of this map, once created. The map can be applied in a variety of ways to assist and/or improve the operation of Anycast deployments. Here are some examples:

Load Measurement and Load Balancing. Applying the results of the map, one can measure which PoP each landmark is routed to for a given Anycast deployment and scale the PoPs to handle the heterogenous number of IP addresses that the landmarks represent. The measurement can be accomplished, for example, in the following way: for each landmark, probe with an ICMP Echo Request with the source IP address set to a value within the anycast prefix. The ICMP Echo Reply will be routed to one of the PoPs in the Anycast deployment. A suitable method for probing/testing in this way is known in the art, and described for those skilled in the art, in Wouter B De Vries, Ricardo de O Schmidt, Wes Hardaker, John Heidemann, Pieter-Tjerk de Boer, and Aiko Pras. 2017. "Broad and load-aware anycast mapping with verfploeter." In ACM Internet Measurement Conference. [17] As noted, each landmark represents a set of IP addresses. For each PoP, accumulate the IP addresses routed to it by collecting the IP addresses that each landmark routed to it represent. The load of the PoP can be estimated as the sum of the load of each IP address routed to it.

Deployment Planning: using the map and probing of the landmarks, e.g., as just described, we can estimate the routing to an Anycast deployment before the system is used in production and receives production traffic.

Performance Optimization: One can apply the map to identify performance degradation due to high RTT (round-trip-time), by probing the landmarks from the PoPs they are routed to. By probing the landmarks and measuring the RTT of the responses to a given sink PoP, we can estimate latency from all partitions to each sink of an Anycast deployment. Using this data, one can identify which landmarks (and partitions) suffer from performance degradation and make Anycast prefix advertisement changes to mitigate.

In a related performance optimization, one can apply the map to perform AB testing by adjusting Anycast deployments via conventional available means known to those skilled in the art (not covered in this application) and repeating measurement of routing/RTT.

BRIEF DESCRIPTION OF THE DRAWINGS

The invention will be more fully understood from the following detailed description taken in conjunction with the accompanying drawings, in which:

FIG. 6 is a diagram showing an algorithm in accord with the teachings hereof; and, FIG. 7 is a diagram showing a simplified pseudocode version of the algorithm shown in FIG. 6.

Figure 1:
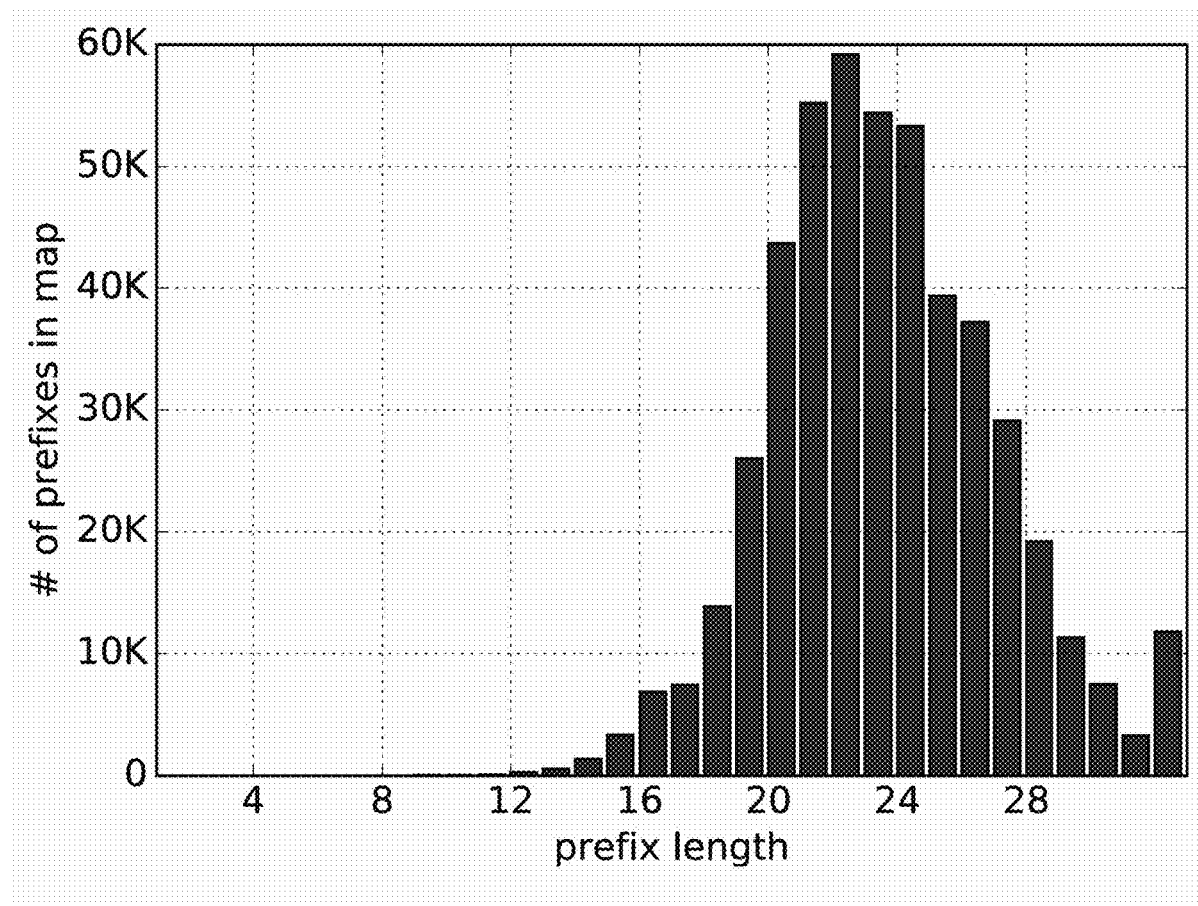
FIG. 1 is a diagram illustrating size of the prefixes comprising the map, in accordance with an embodiment of the invention.

Numerical labels are provided in some FIGURES solely to assist in identifying components being discussed in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought.

1.0 Concept

Anycast deployments split the Internet into catchments. The catchments of a given deployment are a function of the deployment itself and routing on the Internet. We combine the catchment information from multiple anycast deployments to learn about the underlying Internet topology and routing policies that cause partitions of IP-space to be routed differently from one another. By combining the catchment information from enough anycast deployments, we create a map of the fault lines of the Internet where routing changes occur. In other words, we create a mapping of IP addresses into partitions where the IP addresses within a partition are always part of the same catchment regardless of anycast deployment.

First, consider a single anycast prefix $a_1$ advertised from two PoPs, $l_1$ and $l_2$. We use two PoPs for ease of exposition, but the method can generalize to any number of PoPs. Using any technique available, traffic is induced from all of IP-space to the anycast prefix splitting the Internet into two partitions, the portion that is the catchment for $l_1$ and the portion that is the catchment for $l_2$, $P_{a1 \to l1}$ and $P_{a1 \to l2}$, respectively. Note that the two catchments need not be composed of contiguous IP-space. Next, take a second anycast prefix $a_2$ again advertised from two different PoPs, $l_3$ and $l_4$. Again, the Internet is split into two sections: $P_{a2 \to l3}$ and $P_{a2 \to l4}$. When considered together, $a_1$ and $a_2$ split the Internet into 4 possible partitions: $P_{a1 \to l1, a2 \to l3}$, $P_{a1 \to l2, a2 \to l3}$, $P_{a1 \to l1, a2 \to l4}$, and $P_{a1 \to l2, a2 \to l4}$. Any partitions that are empty can trivially be ignored.

Using n anycast prefixes, $a_1, a_2, a_3, \ldots, a_n$, the Internet is split into up to $2^n$ partitions. As $n \to \infty$, the number of partitions is bounded by the number of IP addresses on the Internet. Practically, however, we expect the number of partitions to be far less as many hosts on the Internet experience the same routing due to residing in the same topological location and having the same routing policies applied to them. We call the discovered partitions "consistently routed" because all IP addresses within the partition are always routed to the same PoP regardless of the anycast deployment in question.

Because all IP addresses ("IPs") within a partition are consistently routed, the routing of any IP address within a partition is representative of all IPs in the partition. Thus, a landmark IP address may be selected from within the partition and used in measurements with the understanding that the observed results apply to the entire partition.

Note that many types of network routing changes caused by traffic engineering will not perturb the map. For example, traffic being re-routed from one path to another does not invalidate the map because the map indicates that partitions of IP-space should be routed together, not to where they are routed.

2.0 Implementation

In this section, we describe a method to generate the map using real world data from a production system and discuss algorithmic adjustments to the theory needed to address real world problems.

2.1 Dataset

To create a map as described previously, we can use logs captured from an anycast authoritative DNS service. The DNS service uses 22 IPv4 anycast prefixes, each used for authoritative hosting of a wide variety of DNS zones and advertised from a distinct set of PoPs distributed around the entire globe. Log lines from the authoritative nameservers include the source IP address and the destination IP address—which is from one of the 22 anycast prefixes—of the DNS query. From the nameserver that logs the query, we can infer the catchment of the source IP address for the anycast prefix identified by the destination address. We use DNS traffic logs to create the map, but note that a map could be generated from logs for other types of Anycast traffic, including web access.

We collect 5 days of logs and summarize the data in Table 1, 2018-06-14 through 2019-02-21. R2019-02-21 dataset is collected from recursive resolvers and discussed in Section 3.4. In addition to the number of DNS queries in each dataset and the number of source IP addresses, we compute the number of /24 blocks that the source IP addresses are within, use Team Cymru [7] to determine the ASN, and use the commercially available geolocation service EdgeScape [2] to determine the country code of each source IP address in our datasets. All 5 days have similar properties.

TABLE 1

Datasets used in this paper

| Date | Queries | Source IPs | /24 Blocks | ASNs | Countries |
|---|---|---|---|---|---|
| 2018 Jun. 14 | 138 B | 5.8M | 1.6M | 47K | 238 |
| 2019 Feb. 7 | 129 B | 5.1M | 1.5M | 44K | 240 |
| 2019 Feb. 8 | 139 B | 5.0M | 1.5M | 41K | 243 |
| 2019 Feb. 14 | 158 B | 5.5M | 1.6M | 42K | 243 |
| 2019 Feb. 21 | 168 B | 5.4M | 1.6M | 44K | 240 |
| R2019 Feb. 21 | 2.26 B | 385K | 107K | 2952 | 84 |

Since our theoretical approach expects complete data from all IP addresses on the Internet, we attempt to estimate how complete our datasets are. First, in terms of IP addresses, our datasets cover roughly 0.1% of the approximately 3.7B total IPv4 addresses excluding reserved space [25] and 0.5% of the 1.1B IPv4 addresses estimated to be in use as of 2014 Clearly, our datasets are not exhaustive. However, the number of active /24 blocks on the Internet is estimated as 4.8M in 2013 [15] and 6.3M in 2014 [31] of which our datasets cover 31% and 24%, respectively. Further, 65K ASNs appear in routing tables [10] and our datasets cover 63-72% of that number. Finally, EdgeScape recognizes 248 country codes of which 96-98% are covered in our datasets. Thus, we conclude that, while our data is incomplete, the coverage of our datasets is sufficient to produce interesting and meaningful results with some error, We attempt to quantify the error in a later section,

2.2 Algorithm

In this section, we describe the method of generating a map. The input to our algorithm is the total hits (DNS queries) arriving at each PoP from each IP address to each anycast prefix over a 24 hour period. We use a time window of one day to avoid missing parts of the globe due to diurnal patterns. First, we deal with each anycast prefix individually in Algorithm 1 to find maximum block covering IP addresses with the constraint that all of the IP addresses covered are in the same catchment. Using a greedy approach, the algorithm loops through each IP address in turn and then using the IP address as a root, the algorithm attempts to find a covering block of the root IP address where (i) all covered IP addresses are routed to the same PoP, (ii) none of the covered IP addresses are already covered by another covering block, and (iii) the covering block cannot be further expanded without violating (i) or (ii). In this way, we identify the partitions of IP-space created by a single anycast deployment. While not yet tested experimentally, any one of the standard approaches used in vector clustering (such as DBSCAN) may be tried, tuned, and if suitable used as an alternative to the greedy approach, as long as the approach achieves the goal of clustering IP addresses that are routed to the same PoP together.

In the 2019-02-07 dataset, we observe that 890K (17%) IP addresses are routed to multiple PoPs for the same anycast prefix over the 24 hour period. One potential cause is route instability that, while rare, does occur [23, 29, 30]. Because our data is aggregated over a day, the routing changes observed may be due to a variety of other causes as well, some long time scale and some short. These include:

Maintenance events both in the PoPs and in networks along the path can cause all traffic routed to one PoP to shift to another for time periods ranging from minutes to hours.

The data is DNS queries from (predominantly) recursive resolvers that use an ephemeral port number for each query [27]. Thus, traffic engineering techniques that hash the port numbers (e.g., equal-cost multi-path) may spread traffic from a single IP address among multiple PoPs on a packet-by-packet basis.

Other traffic engineering that causes traffic to shift between routes at specific times, e.g., due to traffic volume increases during peak times.

We make no attempt to distinguish between these causes of routing changes, noting they are all possible in production traffic. Thus, practical implementations of our methodology must contend with all sources of route changes and we design our algorithm to explicitly take them into account as shown in FIG. 6.

A simplified pseudocode of the above FIG. 6 algorithm is presented in FIG. 7 for ease of reading.

Instead of looking for covering blocks where all covered IP addresses are routed to a single PoP, we relax the constraint by looking for covering blocks where all covered IP addresses are routed to the same set of PoPs over the day. Thus, if the root switches sink from A to B during the 24 hours, we look for other IP addresses that have also switched between the same two sinks during the day. Further, because 44% of IP addresses in the 2019-02-07 dataset sent less than 10 DNS queries to at least one anycast prefix, we cannot be confident that we observe all routing changes that impacted these IP addresses throughout the 24 hour period. Thus, we may only have samples in our dataset from when the IP address was in the catchment of A or B and not both. So, the algorithm iterates through IP addresses in order of descending total hits to build covering blocks based upon root IP addresses where we have higher confidence in our Observations due to abundant samples. Next, the covering block is expanded to cover IP addresses if the set of PoPs that they are routed to intersects with the set of PoPs to which the root IP address is routed. Finally, we add a threshold minimum number of hits within a covering block and keep expanding the block if below the threshold. The threshold value limits the generation of small max blocks that represent very few samples. In practice, we find a low threshold value of 10 is sufficient and produces reasonable results.

After finding the maximum blocks for each anycast prefix, we merge them together to form the map. If there is a conflict between the maximum blocks of different anycast prefixes, the more specific one wins. For example, in the scenario where 1.2.3.0/24 and 1.2.3.0/26 both appear in the merger, 1.2.3.0/26 appears in the map while the rest of 1.2.3.0/24 is split into two blocks: 1.2.3.64/26 and 1.2.3.128/25. Then, merged blocks that are routed to the same PoPs per each anycast prefix are combined into a single partition. In a last step, we add the partition /0 to cover any IP-address space that is not covered by any other partition.

3.0 Analysis

The map created from the 2019-02-07 dataset contains 484K prefixes. FIG. 1 shows the length of the prefixes. The most common prefix length is 22-bits but, surprisingly, there are nearly 12K/32 blocks, i.e., individual IP addresses that are routed differently than the IP addresses numerically next to them. Some of the /32 blocks are operated by our institution and we are able to manually verify their routing behavior. We confirm that the hosts in the entire covering /24 block are routed via one of two transit links depending upon the value of the most specific bit in the IP address, generating many /32 blocks in our map. Thus, every other IP address in the /24 block is routed identically and the /32 blocks in the map readily merge into partitions in the final step of our algorithm.

In all, we find the map contains 212K partitions after merging the prefixes. We explore the consistency of the partitions by computing the number of ASNs each partition covers and find that 94% of partitions consist of IPs from a single ASN. Another 6.8K (4%) partitions consist of exactly two ASNs. We expect different ASNs to have different routing policies and this result agrees with that intuition. Conversely, the IP-space of 37% of ASNs is split across multiple partitions, higher than observed in [17] likely due to the larger number of PoPs in our study. This result is also expected as it is common for ASNs to use multiple peering links as in the /32 blocks example above.

3.1 Is 22 Anycast Prefixes Enough?

Figure 2:
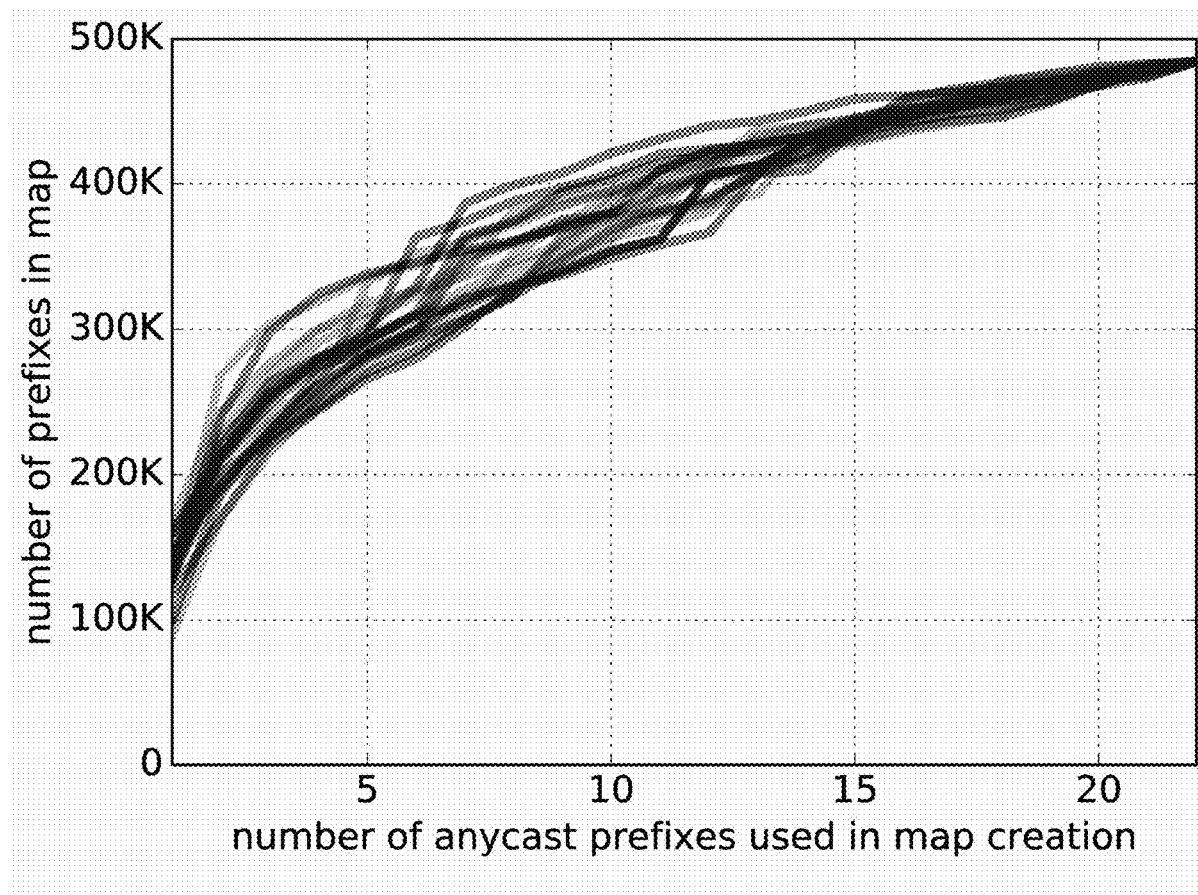
FIG. 2 is a diagram illustrating size of the map in prefixes as a function of Anycast prefixes used to create the map, in accordance with an embodiment of the invention.

In Section 1 (Concept), we proposed the use of a potentially infinite number of anycast prefixes to create a map. Practically, however, the number of anycast prefixes is a finite number and we have data from 22. To answer whether 22 anycast prefixes is sufficient to produce a map with the desired properties, we create maps with subsets of the 22 anycast prefixes where the set size varies from 1 to 21 anycast prefixes. FIG. 2 shows the size of the map in blocks as a function of the number of anycast prefixes used to create the map. Each line (20 total) is a different random permutation of the 22 anycast prefixes. The slope of the curve should approach zero as the number of anycast prefixes becomes sufficient to discover all routing fault lines. However, the curves clearly still have a positive slope approaching 22 deployments. Clearly, 22 anycast prefixes is insufficient to discover all fault lines and thus there is error in our map. The next sections quantify that error.

3.2 Error in Map

Figure 3:
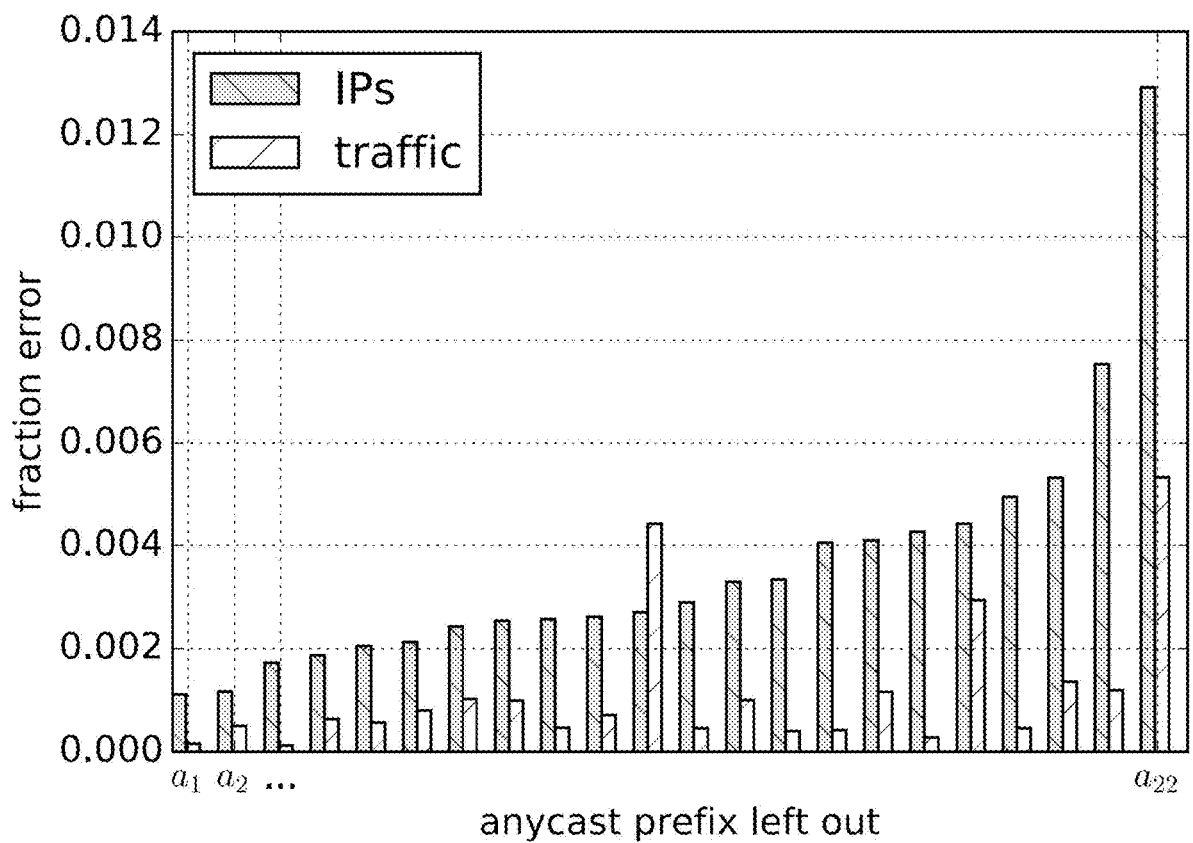
FIG. 3 is a diagram illustrating cross validation of map where one anycast prefix is left out at a time, in accordance with an embodiment of the invention.

The method of generating the map in the presence of routing changes described in Section 2 necessarily causes some error in the map. However, measuring the error in the map is not straightforward. Recall that the map indicates that all IP addresses in a partition should be consistently routed, not to which sink they are routed. Therefore, we define error as follows. For each partition in the map, first calculate the most frequent set of sinks in terms of hits (i.e., in terms of DNS queries). Any IP addresses routed to a different set is error. Summing the number of erroneous IP addresses across partitions and dividing by the total IP addresses gives a metric for error in terms of IPs. However, since the volume of hits per IP address is skewed, we also calculate error in terms of traffic by summing the erroneous hits across partitions and dividing by the total hits in the dataset. In the 2019-02-07 dataset, the map error on the training data is 0.15% in IPs and 0.03% in traffic. Our method for dealing with dealing with routing changes adds little error. Next, we perform cross validation to estimate the predictive capability of the map on data not part of the training set. Note that 34% of the IP addresses in the 2019-02-07 dataset only ever sent DNS queries to a single anycast prefix. Thus, we perform cross validation by withholding data for one any-cast prefix at a time, generate a map using the remaining 21 anycast prefixes, and then calculate the error of the map on the withheld data. The resulting errors per left out anycast prefix are shown in FIG. 3. The maximum error is 129% in IPs and 0.53% in traffic, while the average error is 0.36% in IPs and 0.12% in traffic. The error remains low despite the introduction of data not in the training set.

Figure 4:
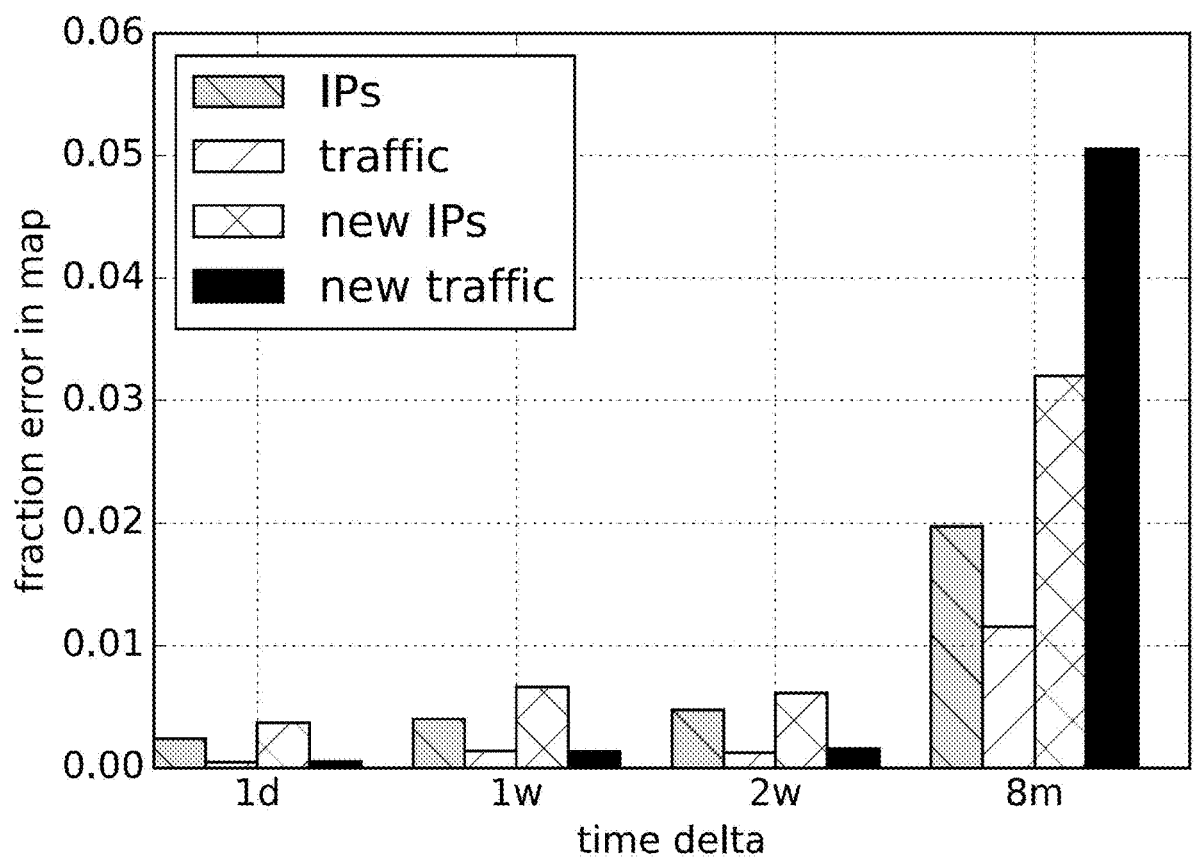
FIG. 4 is a diagram illustrating error in the map over time, in accordance with an embodiment of the invention.

However, part of the predictive power of an Internet map is the ability to generate it at time t and then use it to anticipate behavior at time t+$\Delta$. We investigate the error in the map over time by using the other datasets in Table 1. FIG. 4 shows the error for values of $\Delta$ from 1 day to 8 months. Note that 8 months is exceptional because, instead of generating the map with the 2019-02-07 dataset, we use the 2018-06-14 dataset and compute the error on the 2019-02-14 dataset. The bars "IPs" and "Traffic" correspond to our definitions of error above. We introduce two new measures of error in "new IPs" and "new Traffic" where the IP addresses over which the error is calculated are restricted to only those in the dataset used to compute error but not in the dataset used to generate the map, and thus anticipated to be more prone to error. Up to a two week $\Delta$, the error by all metrics remains well below 1%, indicating the routing policies driving our map are relatively stable over short time windows. The error after eight months is large, suggesting that maps are useful for time scales on the order of weeks as opposed to months.

3.3 Alternative Methods

Above, we demonstrate the error present in a map generated using our technique. However, without comparison it is impossible to determine whether the reported error rate is good. As to the best of our knowledge there is no previous work aimed at predicting consistent routing, we compare our method using a one week $\Delta$ to two alternative rudimentary methods: (i) partition the Internet by /24 blocks assuming each block is consistently routed and (ii) use the prefixes visible in BGP route tables obtained via Team Cymru [7]. The latter uses the reachability information advertised by other ASNs to split the Internet up accordingly. To compare the methods we must consider both error rate and map size as there is a trivial solution with zero error when the map consists of entirely /32 blocks. Table 2 shows the three methods in order of descending map size. Partitioning the Internet into /24 blocks produces low error but at the cost of a very large map size meaning that it takes more IP addresses (and measurements) to represent the Internet. Prefixes appearing in BGP routing tables creates a smaller map but the error is very large. This should be expected as routing tables contain routes to an IP address whereas our goal is to estimate routing from the IP address. Of the three methods, our map created using anycast prefixes generates the smallest map with the lowest error.

3.4 Cross-Domains Use

Our map is generated from authoritative DNS server logs where the majority of clients can be inferred to be recursive resolvers. Most hosts on the Internet, however, are not recursive resolvers as evidenced by our low IP coverage in Section 2.1, Thus, our map may be specific to recursive resolvers and have less utility for hosts in other domains.

To explore this notion, we use a dataset of DNS logs from an anycast recursive resolver service where the clients are stub resolvers, likely located in edge networks or home networks. Shown in Table 1 as R2019-02-21, the dataset is much smaller than the other datasets, between 1 and 2 orders of magnitude smaller depending upon metric. Comparing to the 2019-02-14 dataset so that $\Delta=1$ week, we check the overlap between the datasets. As expected, we find that only 6% of IP addresses and 35% of their covering /24 blocks in R2019-02-21 are also in the 2019-02-14 dataset. For comparison, fully 60% of IP addresses and 83% of /24 blocks in the 2019-02-21 dataset are also in the 2019-02-J4 dataset. The computed error on the recursive dataset is 8% in IPs and 3% in traffic, much higher than the 0.13% and 0.04%, respectively, reported in Table 2 for the same value of $\Delta$. Thus, we conclude that the domain of the data used to create the map and the domain in which the map is used should match. For example, the map produced from authoritative DNS logs is appropriate for analyzing the catchments of recursive resolvers; to analyze the catchments of end-users, a map should be generated from end-user anycast traffic.

TABLE 2

Comparison with alternative mapping methods

| Method | Map Size | Error (IPs) | Error (Traffic) |
|---|---|---|---|
| /24 Blocks | 1.55M prefixes | 0.77% | 0.44% |
| BGP Prefixes | 229K prefixes | 5.46% | 6.70% |
| Anycast Map | 212K partitions | 0.13% | 0.04% |

Section 4.0 Considerations

Here, we lay out some considerations in generating a map from anycast traffic. Real world implementations should be aware of these details and properly account for them in their use case.

IP address spoofing can lead to an erroneous map as the IP spoofing misleads as to which catchment an IP address belongs. Of course, this is not unique to our technique and any technique that uses source IP address of Internet traffic, particularly in connectionless protocols, is vulnerable. We are confident that IP spoofing is a sample portion of our datasets, but any use of our technique should discard suspicious traffic (e.g., attacks).

Multiple anycast prefixes were available to us for our analysis, however multiple anycast prefixes is not inherently necessary to produce a map. It is conceivable to use a single anycast prefix iterated through multiple deployments instead. This may allow use of many more than the 22 anycast deployments in this document which, as noted in Section 3.1, is too few to perfectly reproduce all fault lines. It will not, however, replace the need for distinct physical deployments.

Section 5.0 Conclusion & Future Work

In this document, we describe a technique for creating a map of the Internet using existing anycast catchments and show that it is possible to measure the routing of landmarks chosen from the map that are each representative of routing for partitions of IP-space. We present an algorithm for merging the catchments of multiple anycast deployments together creating a map partitions the Internet where each partition is consistently routed, i.e., all IPs in the partition are part of the same catchment regardless of anycast deployment. We show that the resulting map can predict consistent routing with low error even up to 2 weeks after the map was generated. Finally, in comparison to alternative methods, we demonstrate that the map generated from anycast catchments is both smaller and lower error.

We highlight the following areas for future work. (i) As noted in Section 3.4, the maps created from authoritative DNS server logs perform poorly on anycast traffic from other domains. The effectiveness of our technique in other domains (e.g., anycast content delivery) needs study. (ii) IPv6 is ripe for similar analysis. We study IPv4 only due to dataset limitations. However, our technique is not inherently IP version specific. Further, we posit our methodology will be more beneficial in IPv6 than IPv4 because of the impracticality of scanning the much larger IPv6-space. (iii) Routing changes in the training data pose a problem for our methodology. We propose a technique described in Section 2.2 to deal with routing changes and empirically observe good results using it (see Section 3). However, other solutions producing better results may exist. (iv) We focus on the use of the map for predicting anycast catchments. But knowing the fault lines in IP-space where routing changes is likely beneficial in other measurements as well. Although not explored in this document, we believe our method may be a fruitful in other areas of measurement.

Use in Content Delivery Networks (CDNs)

The teachings hereof can be applied (without limitation) to PoPs in a content delivery networks (CDNs). The teachings of the following US patents are hereby incorporated by reference in their entireties: U.S. Pat. Nos. 6,108,703; 7,293,093; 7,096,263; 7,096,266; 7,484,002; 7,523,181; 7,574,499; 7,240,100; 7,725,602; 7,716,367; 7,996,531; 7,925,713; 7,058,706; 7,251,688; 7,274,658; 7,912,978; 8,195,831.

Computer Based Implementation

The teachings hereof may be implemented using conventional computer systems, but modified by the teachings hereof, with the components and /or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
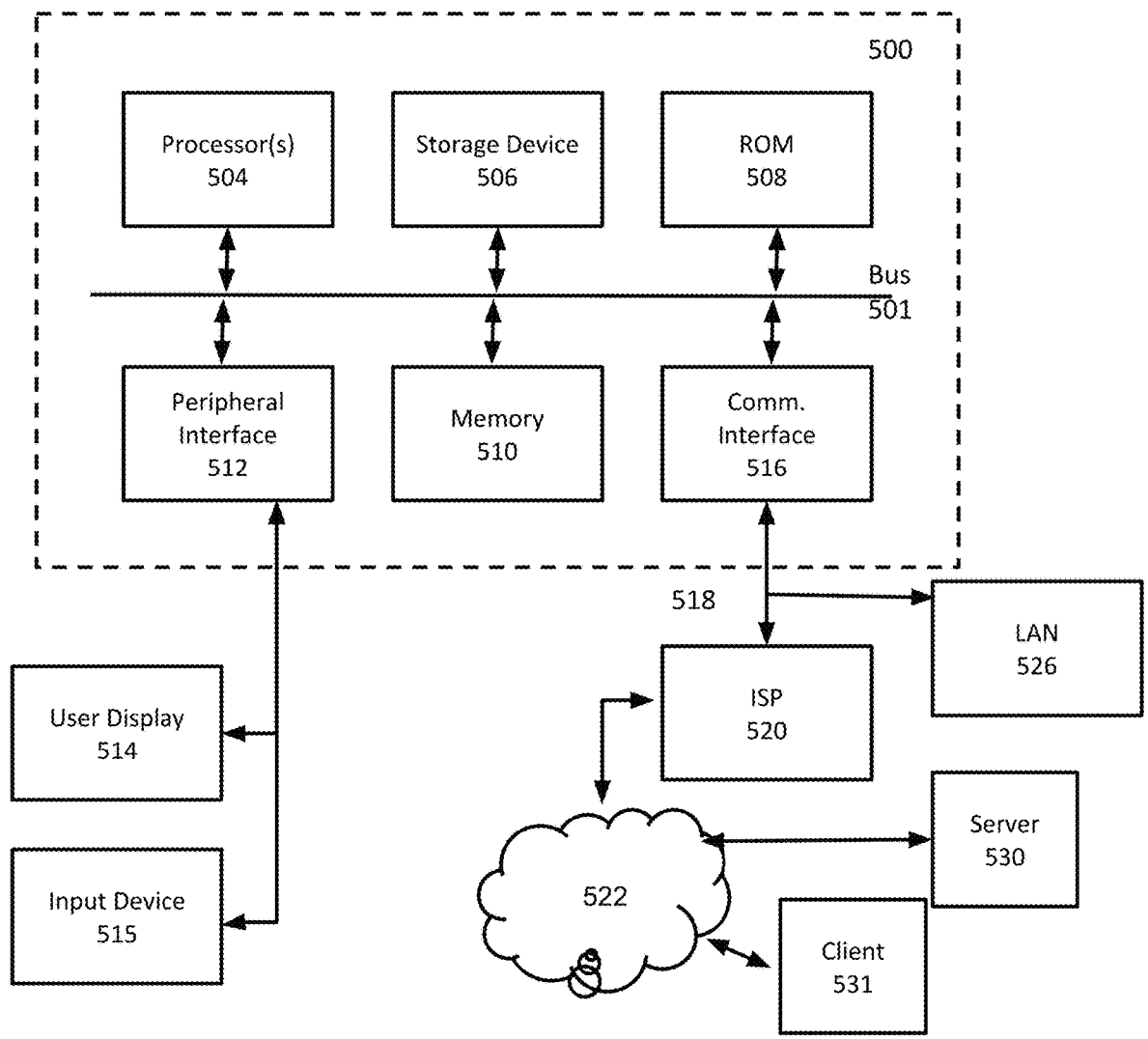
FIG. 5 is a block diagram illustrating hardware in a computer system that may be used to implement the teachings hereof

FIG. 5 is a block diagram that illustrates hardware in a computer system 100 upon which such software may run in order to implement embodiments of the invention. The computer system 100 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 500 includes a microprocessor 504 coupled to bus 501. In some systems, multiple processors and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. Note that the computer system 500 may be operated remotely and need not have a local user interface. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer,) between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 518 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought, and are incorporated by reference herein as part of the disclosure of this patent document.

It is noted that trademarks appearing herein are the property of their respective owners and used for identification and descriptive purposes only, given the nature of the subject matter at issue, and not to imply endorsement or affiliation in any way.

REFERENCES

[1] Cloudflare 1.1.1.1. Public Recursive Resolver, Retrieved June 2019 from https://1.1.1.1/
[2] Akamai EdgeScape. Retrieved June 2019 from https://developer.akamai.com/edgescape
[3] CloudFlare. Retrieved June 2019 from https://www.cloudflare.com/
[4] Google Public DNS. Retrieved June 2019 from https://developers.google.com/speed/public-dns/
[5] Limelight Networks. Retrieved June 2019 from https://www.limelight.com/
[6] Quad9. Retrieved June 2019 from https://www.quad9.net/
[7] Team Cymru—IP to ASN Mapping. Retrieved June 2019 from http://www.team-cymru.com/IP-ASN-mapping.html
[8] Joe Abley and K Lindqvist. 2006. *Operation of anycast services*. RFC 4786. https://tools.ietf.org/html/rfc4786
[9] Hitesh Ballani, Paul Francis, and Sylvia Ratnasamy. 2006. A measurement-based deployment proposal for IP anycast. In *ACM Internet Measurement Conference*.
[10] Tony Bates, Philip Smith, and Geoff Huston. [n. d.]. CIDR Report. ([n. d.]). Retrieved June 2019 from http://www.cidr-report.org/as2.0/
[11] Matthew Caesar and Jennifer Rexford. 2005. BGP routing policies in ISP networks. *IEEE Network* 19, 6 (2005), 5-11.
[12] Danilo Cicalese, Jordan Augé, Diana Joumblatt, Timur Friedman, and Dario Rossi. 2015. Characterizing IPv4 anycast adoption and deployment. In *ACM Conference on emerging Networking EXperiments and Technologies*.
[13] Danilo Cicalese, Diana Joumblatt, Dario Rossi, Marc-Olivier Buob, Jordan Augé, and Timur Friedman. 2015. A fistful of pings: Accurate and lightweight anycast enumeration and geolocation. In *IEEE Conference on Computer Communications*.
[14] Kimberly Claffy, Young Hyun, Ken Keys, Marina Fomenkov, and Dmitri Krioukov. 2009. Internet mapping: from art to science. In *IEEE Cybersecurity Applications & Technology Conference for Homeland Security*.

[15] Alberto Dainotti, Karyn Benson, Alistair King, Michael Kallitsis, Eduard Glatz, Xenofontas Dimitropoulos, et al. 2013. Estimating Internet address space usage through passive measurements. *ACM SIGCOMM Computer Communication Review* 44, 1 (2013), 42-49.

[16] Ricardo de Oliveira Schmidt, John Heidemann, and Jan Harm Kuipers. 2017. Anycast latency: How many sites are enough?. In *Passive and Active Measurement Conference.*

[17] Wouter B De Vries, Ricardo de O Schmidt, Wes Hardaker, John Heidemann, Pieter-Tjerk de Boer, and Aiko Pras. 2017. Broad and load-aware anycast mapping with verfploeter. In *ACM Internet Measurement Conference.*

[18] Zakir Durumeric, Eric Wustrow, and J Alex Halderman. 2013. ZMap: Fast Internet-wide scanning and its security applications. In *USENIX Security Symposium.*

[19] Xun Fan and John Heidemann. 2010. Selecting representative IP ad-dresses for Internet topology studies. In *ACM Internet Measurement Conference.*

[20] Danilo Giordano, Danilo Cicalese, Alessandro Finamore, Marco Mellia, Maurizio M Munafò, Diana Zeaiter Joumblatt, and Dario Rossi. 2016. A First Characterization of Anycast Traffic from Passive Traces. In *Network Traffic Measurement and Analysis Conference.*

[21] Ramesh Govindan and Hongsuda Tangmunarunkit. 2000. Heuristics for Internet map discovery. In *IEEE International Conference on Computer Communications.*

[22] John Heidemann, Yuri Pradkin, Ramesh Govindan, Christos Papadopoulos, Genevieve Bartlett, and Joseph Bannister. 2008. Census and survey of the visible Internet. In *ACM Internet Measurement Conference.*

[23] James Hiebert, Peter Boothe, Randy Bush, and Lucy Lynch. 2006. Determining the cause and frequency of routing instability with anycast. In *Asian Internet Engineering Conference.*

[24] Bradley Huffaker, Marina Fomenkov, Daniel J Plummer, David Moore, Kimberly Claffy, et al. 2002. Distance metrics in the Internet. In *IEEE International Telecommunications Symposium.*

[25] Internet Assigned Numbers Authority. [n. d.]. IPv4 Address Space Registry. ([n. d.]). Retrieved June 2019 from https://www.iana.org/assignments/ipv4-address-space/ipv4-address-space.xhtml

[26] Yakov Rekhter, Tony Li, and Susan Hares. 2006. *A Border Gateway Protocol* 4 *(BGP-*4). RFC 4271. https://tools.ietforg/html/rfc4271

[27] Kyle Schomp, Tom Callahan, Michael Rabinovich, and Mark Allman. 2014. Assessing DNS Vulnerability to Record Injection. In *Passive and Active Measurement Conference.*

[28] Neil Spring, Ratul Mahajan, and David Wetherall. 2002. Measuring ISP topologies with Rocketfuel. In *ACM SIGCOMM Computer Communication Review*, Vol. 32. 133-145.

[29] Lan Wei and John Heidemann. 2017. Does anycast hang up on you? In *Network Traffic Measurement and Analysis Conference.*

[30] Yang Richard Yang, Haiyong Xie, Hao Wang, Avi Silberschatz, Arvind Krishnamurthy, Yanbin Liu, and Li Erran Li. 2005. On route selection for interdomain traffic engineering. *IEEE Network* 19, 6 (2005), 20-27.

[31] Sebastian Zander, Lachlan L H Andrew, and Grenville Armitage. 2014. Capturing ghosts: Predicting the used IPv4 space by inferring unobserved addresses. In *ACM Internet Measurement Conference.*

[32] Sermpezis, P. and Kotronis, V. Inferring Catchment in Internet Routing, *Proceedings of the ACM Measurement and Analysis of Computing Systems* Vol. 3 Issue 2 (June 2019)

The invention claimed is:

1. A method of creating a network map, comprising:
providing a plurality of Anycast deployments on the Internet to deliver one or more services to clients, each of the plurality of Anycast deployments comprising a block of one or more IP addresses advertised from two or more points of presence (PoPs);
determining a set of two or more client IP addresses that are routed to the same PoP as one another across the plurality of Anycast deployments, where the plurality of Anycast deployments have at least one of (i) different blocks of one or more IP addresses and (ii) different advertising PoPs;
selecting a particular IP address from the set of two or more IP addresses to represent the set of two or more IP addresses in a test; and,
based at least in part on a result of the test, taking an action to improve the delivery of the one or more services.

2. The method of claim 1, wherein the test comprises running network probe against the selected particular IP address.

3. The method of claim 1, wherein the test comprises any of load measurement and latency estimation.

4. The method of claim 1, the action comprising any of load balancing, performance optimization, and deployment planning, with respect to at least one Anycast deployment.

5. The method of claim 1, the action comprising changing an Anycast prefix advertisement.

6. The method of claim 1, the block of one or more IP addresses representing an Anycast prefix.

7. A non-transitory computer-readable medium storing program instructions for execution one or more processors or one or more computers, said program instructions comprising instructions to cause the one or more computers to:
provide a plurality of Anycast deployments on the Internet to deliver one or more services to clients, each of the plurality of Anycast deployments comprising a block of one or more IP addresses advertised from two or more points of presence (PoPs);
determine a set of two or more client IP addresses that are routed to the same PoP as one another across the plurality of Anycast deployments, where the plurality of Anycast deployments have at least one of (i) different blocks of one or more IP addresses and (ii) different advertising PoPs;
select a particular IP address from the set of two or more IP addresses to represent the set of two or more IP addresses in a test; and,
based at least in part on a result of the test, take an action to improve the delivery of the one or more services.

8. The non-transitory computer-readable medium of claim 7, wherein the test comprises running network probe against the selected particular IP address.

9. The non-transitory computer-readable medium of claim 7, wherein the test comprises any of load measurement and latency estimation.

10. The non-transitory computer-readable medium of claim 7, the action comprising any of load balancing, performance optimization, and deployment planning, with respect to at least one Anycast deployment.

11. The non-transitory computer-readable medium of claim 7, the action comprising changing an Anycast prefix advertisement.

12. The non-transitory computer-readable medium of claim 7, the block of one or more IP addresses representing an Anycast prefix.

13. A computer system comprising circuitry forming one or more processors and memory storing instructions for execution on the one or more processors, upon execution the instructions causing the computer system to:

provide a plurality of Anycast deployments on the Internet to deliver one or more services to clients, each of the plurality of Anycast deployments comprising a block of one or more IP addresses advertised from two or more points of presence (PoPs);

determine a set of two or more client IP addresses that are routed to the same PoP as one another across the plurality of Anycast deployments, where the plurality of Anycast deployments have at least one of (i) different blocks of one or more IP addresses and (ii) different advertising PoPs;

select a particular IP address from the set of two or more IP addresses to represent the set of two or more IP addresses in a test; and, based at least in part on a result of the test, take an action to improve the delivery of the one or more services.

14. The computer system of claim 13, wherein the test comprises running network probe against the selected particular IP address.

15. The computer system of claim 13, wherein the test comprises any of load measurement and latency estimation.

16. The computer system of claim 13, the action comprising any of load balancing, performance optimization, and deployment planning, with respect to at least one Anycast deployment.

17. The computer system of claim 13, the action comprising changing an Anycast prefix advertisement.

18. The computer system of claim 13, the block of one or more IP addresses representing an Anycast prefix.

* * * * *